United States Patent Office 2,984,572
Patented May 16, 1961

2,984,572

METHOD FOR THE PRODUCTION OF RAISINS AND PRODUCT PRODUCED THEREBY

Norman Barsel, 133—17 Francis Lewis Blvd., Laurelton 13, N.Y., and Joseph J. Goodman, 32 Woodsend Road, Larchmont, N.Y.

No Drawing. Filed Apr. 8, 1955, Ser. No. 500,285

2 Claims. (Cl. 99—168)

The present invention relates to a method of applying a protective coating to natural food products and to articles of food coated with such protective coating.

More particularly, the invention relates to a method of applying a protective coating of an organic compound of silicon to fruits in order to enhance their keeping qualities and to novel products of enhanced keeping quality.

The methods of preservation known to the prior art have included the coating of fruits and vegetables with films of various substances, including paraffin, nitrocellulose lacquers, and polymerized isobutylene, but the use of these materials is attended with certain inherent disadvantages, such as the difficulty of controlling film thickness in the case of paraffin, and problems of flammability hazard and adequate viscosity control in the case of nitrocellulose coatings. The result has been that the coating material of the prior art have been confined in their application largely to citrus fruits.

Organic silicon compounds have been used as a coating upon a limited number of prepared or processed food products, such as prepared cereals, baked goods, refined sugar and salt, and certain kinds of candy, in order to render these products resistant to moisture. This problem is one which is quite unlike the problem of preservation, for example, of fresh fruits and vegetables, which is one of water retention rather than of water repellency, and which also involves retarding the growth of bacteria and/or fungi.

In accordance with the present invention, it has been found that organic compounds of the class which is known broadly as silicone polymers may be readily applied to perishable foods especially fruits, either in solution in a solvent, or in the form of a vapor, to form a thin, non-toxic fungicidal, bactericidal and preservative coating which greatly enhances the keeping period of such foods. The silicone polymers which have been found to be most suitable are the liquid types known as silicone oils.

The present invention is especially applicable to fleshy fruits having seeds free of the fleshy pericarp such as apples, pears, plums or the like which are preserved in substantially their original condition for a relatively long period of time. In the case of fruits wherein the seeds are embedded in the fleshy pericarp, such as grapes, the addition of the silicon film seems to actually enhance the release of moisture therefrom so that the grapes are transformed in due course into raisins of good quality and a flavor more closely approximating the original grape flavor. This action is however nevertheless accompanied by preservative action since the so-treated grapes are free from mold and/or spoilage for a much longer period than the untreated specimens. There has also been discovered therefore, as one of the specific embodiments of the present invention, a novel process for the production of coated raisins having the flavor of the original grape and a superior surface appearance.

In practicing the process, in general, the fruit is preferably immersed completely in an organic solvent solution of the silicone oil or fluid. It has been found that preferably an amount of silicone oil or fluid is used so as to form from 5% to 25% by weight of the final solution and a 10% solution has been found especially practical. The time of immersion is not believed critical so long as the fruit is immersed for a sufficient period of time so that a very substantial part of the fruit is covered by a film of silicone and preferably the entire fruit surface is so covered. Further if a volatile solvent is used which has some effect, such as a dehydrating effect on the fruit surface, it is desirably that the fruit be quickly dipped and quickly allowed to dry whereby the volatile solvent is rapidly removed. The final product is enhanced not only as to keeping qualities but also in appearance since the silicone oil imparts a shiny surface to the fruit.

In place of the immersion of the fruit in the solution the fruit may also be coated by spraying the solution of silicone oil on the fruit surface in such manner that a substantial part or substantially all of the surface be covered with a film.

The silicone oils or fluids which are especially suitable for carrying out the method of the present invention are non-toxic, possess a high degree of oxidative stability, and are characterized by small change of viscosity with temperature. The range of viscosity of such silicone oils may be from about 300 to about 5000 centistokes at 100° F. Utilizing silicone oils of this range in solution in the concentrations hereinbefore set forth has been found to produce a thin film of sufficient thickness to exert a pronounced preservative effect.

The silicone oils contemplated by the present invention are broadly the polyorganosiloxanes, such as the methyl, methylphenyl, or phenyl silicone polymers, for example, the dimethylpolysiloxanes. In general, the alkylated silicone oils are prepared by treatment of silicon tetrachloride with a suitable Grignard reagent, to obtain intermediate alkyl chlorsilanes, or in the case of aryl silicone oils, for example by heating an aryl halide with powdered silicon in the presence of a catalyst. The organohalosilanes thus obtained are converted to monomeric silanol compounds by reaction with water. The polymers are obtained by condensation and elimination of the elements of water from the monomers, to yield polymeric silicones of varying degrees of alkylation or arylation, having difunctional chains of varying length, and exhibiting corresponding degrees of viscosity from very thin to highly viscous flow, depending upon molecular weight. Thus, silicone oils of relative low molecular weight and hence low viscosity may be used in applications where a thin film is all that is necessary or desirable. Examples of such fluids are the alkyl-, or alkylaryl-silicone polymers marketed by the General Electric Co. under the name "SF–96 Fluids." Where a high degree of viscosity is required, those fluids having viscosities above 1000 centistokes, which exhibit pseudoplastic flow, may be used, such as the products sold by the same manufacturer under the name "Viscasil Fluids."

The silicone oils may be applied to the fruit or vegetable which is to be coated either in solution in a suitable solvent as heretofore set forth, or in the form of an emulsion, or by contacting the article of food with the vapor of the silicone oil. The silicone oils may be used singly or in the form of blends of one or more, depending upon desired viscosity or other characteristics.

Where the silicone oils are to be applied to the food in the form of solutions, a wide variety of volatile solvents are available. These solvents include aliphatic and aromatic hydrocarbons, such as cyclohexane, petroleum ether, gasoline, kerosene, mineral spirits, benzene, toluene, and xylene; ethers such as diethyl ether, di-isopropyl ether, dioxane, and ethylene glycol diethyl ether; halogenated hydrocarbons such as carbon tetrachloride, chloroform, ethylene dichloride, trichlorethylene and perchlorethylene; higher alcohols such as 2-ethylhexanol; and esters such as amyl acetate.

In addition, for purposes of advertising or identification, the silicone oils or their solutions may have incorporated therein organic dyes, such as the oil soluble dyes.

When applied to fresh fruit, the coating of silicone oils act as a water repellent and also as a preservative and germicide, in some instances reducing internal dehydration and shrinkage and in all instances reducing decay and susceptibility to insects, molds and bacteria.

The coating process of the present invention is applicable to the preservation of both orchard fruits and small fruits and when applied to fresh, fleshly fruits having a comparatively firm flesh or pulp and a seed free of the pericarp, the fruits are not only preserved from spoilage but are relatively free from shrinkage as well. Examples of such types of fruit are the hesperidium, inclusive of oranges, lemons, and other citrus fruits; the pepo, such as melons, cantaloupes, and pumpkins; the drupe or stone fruits, such as peaches, plums and cherries; the pome, including apples and pears, and the aggregate, or drupelet, including strawberries, raspberries, and blackberries.

In the case of fruits of the berry class, inclusive of those having a thin skin and seeds imbedded in the pulpy pericarp, such as grapes, tomatoes and blueberries, the application of silicone oils results in external mold control and the preservation thereof, but as pointed out in the case of the grapes, a shrinkage and raisin formation results.

The following examples serve to illustrate the present invention, but are not intended to limit the same:

*Example I*

A 10% solution of a silicone oil having a viscosity of 300 centistokes at 100° F. (Viscasil 300) in diethyl ether was prepared and applied to a number of red plums by immersion or spraying. The excess of solution was allowed to drain off. The solvent evaporated at once leaving the fruit with a shiny coating of the silicone oil. The treated plums, together with a number of untreated plums serving as controls, were stored for a period of 15 days under normal atmospheric conditions of temperature and humidity. The controls started to deteriorate within 5 days. At the end of 15 days, the controls were dark in color, extremely soft, putrified, and inedible with some mold growth. The treated plums, on the other hand, remained red in color, were much harder than the controls, were edible, and did not exhibit any mold formation.

*Example II*

A 10% solution of a silicone oil having a viscosity of 5000 centistokes in diethyl ether was applied to a number of apples by spraying or by immersion, as in Example I. At the end of 25 days' storage under normal atmospheric conditions, the treated apples were edible with no visible rot. Apples used simultaneously as controls had become inedible and showed approximately 20% inside rot.

*Example III*

10% solutions in chloroform were prepared of silicone oils having viscosities of 300 and 5000 centistokes, respectively, and applied to oranges by immersion. The treated oranges, as well as untreated controls were stored at normal room temperature and humidity for a period of ten days. At the end of this period, the treated oranges retained their flavor and firmness much better than the controls, and did not exhibit any mold formation.

*Example IV*

A 10% solution of silicone oil having a viscosity of 300 centistokes at 100° F. (Viscasil 300) in diethyl ether was prepared and applied to California royal grapes. At the end of 30 days' storage at room temperature and humidity the grapes were in good condition with slight evidence of dehydration (wrinkling) whereas an untreated control group showed definite evidence of decay and mold. At the end of about two months the treated grapes were of a plump raisin condition having a flavor far superior to the ordinary raisin. The untreated control group were completely spoiled.

*Example V*

The experiment of Example IV was applied to Concord (wine) grapes. At the end of two weeks the treated grapes showed no evidence of deterioration beyond a very slight wrinkling, whereas the untreated control group had softened and decayed completely. At the end of two months the treated grapes had formed raisins without any trace of mold.

*Example VI*

The experiment of Examples IV and V was repeated with California seedless grapes. No wrinkling or other changes appeared at the end of the first week on the treated grapes whereas the untreated control group showed signs of mold. At the end of six weeks the treated grapes formed raisins of very excellent and unusual grape flavor. The control group was completely unedible after about two weeks.

We claim:
1. A method for the production of raisins comprising coating raw grapes with a silicone oil and allowing the grapes to stand until raisins are formed.
2. A raisin having an enhanced grape-like flavor and a coating of a silicone oil.

References Cited in the file of this patent

UNITED STATES PATENTS

| | | |
|---|---|---|
| 2,474,704 | Taryer | June 28, 1949 |
| 2,512,192 | Yen | June 20, 1950 |
| 2,703,288 | Worson | Mar. 1, 1955 |

OTHER REFERENCES

"Food Industries," January 1951, pp. 44–46, 194.

"Journal of the American Pharmaceutical Association," Scientific Edition, vol. XLII, No. 2, Feb. 1953, pp. 79–85.

"Food and Food Products," Jacobs, 2nd edition, vol. 3, page 1980.